Aug. 21, 1962 R. W. STUART, JR 3,050,685

DIGITAL FREQUENCY DIVIDER AND METHOD

Filed June 24, 1959 4 Sheets-Sheet 1

INVENTOR.
ROBERT W. STUART JR.

BY Rines and Rines

ATTORNEYS

INVENTOR.
ROBERT W. STUART JR.
BY Ries and Ries
ATTORNEYS

DIGITAL FREQUENCY DIVIDER AND METHOD

Filed June 24, 1959 4 Sheets-Sheet 3

INVENTOR.
ROBERT W. STUART JR.
BY Rines and Rines
ATTORNEYS

INVENTOR.
ROBERT W. STUART JR.
BY Rines and Rines
ATTORNEYS

United States Patent Office 3,050,685
Patented Aug. 21, 1962

3,050,685

DIGITAL FREQUENCY DIVIDER AND METHOD

Robert W. Stuart, Jr., Natick, Mass., assignor to General Radio Company, Cambridge, Mass., a corporation of Massachusetts Filed June 24, 1959, Ser. No. 822,620
3 Claims. (Cl. 328—48)

The present invention relates to digital frequency dividers and methods and, more particularly, to multiple-decade switching counter systems, employing high-speed electronic computer techniques and adapter to provide an arbitrary scale of frequency division.

In my article entitled, "A High-Speed Digital Frequency Divider of Arbitrary Scale," appearing on pages 52 through 57 of part 10, Instrumentation and Industrial Electronics, Convention Record of the Institute of Radio Engineers, 1954, the use of multiple decade counting circuits for providing high-speed frequency division is discussed. It is there explained that in such systems every input pulse must be accepted by the counter so that between counting cycles, the presentation of accumulated counter information and counter resetting must be accomplished within a time interval of less than one input pulse repetition period; say, less than one microsecond for a one megacycle input repetition rate. Criteria are set forth for achieving independent counting decades, each having a ten-position switch corresponding to the numbers 0 through 9, and time delays associated with each decade that are not cumulative in such a manner as to reduce the maximum input repetition rate of the frequency divider below that established by the resolving capability of the highest speed decade. A three-decade divider, based upon either of two methods that have been found to involve superior performance from the point of view of maximum number of divisor digits, circuit economy, experimentally determined circuit limitations, and switching simplicity, is fully described in my said article, providing for frequency division by any number from 20 to 999 at frequencies from direct current to over two megacycles.

The present invention has, as an object, to provide an improved frequency division system and method of the type above mentioned that materially relaxes the resolution requirements of the units decade of the multiple decade system. Where, for example, a maximum input repetition frequency of one megacycle required recognition of the reaching of a desired count and resetting of the counter both to occur within one microsecond, so that each of the recognition and resetting operations had to be performed in, say, one-half microsecond, the present invention will permit at least twice as much time for each of the recognition and resetting operations. As later shown, the present invention provides that in a four-tube decade system, a resolution improvement of two-to-one may be obtained over the system described in my said article, and an improvement of three-to-one may be obtained with a ring-type counter system.

A further object is to provide a new and improved counter system of more general utility, also.

Other and further objects will be explained hereinafter and will be more particularly pointed out in the appended claims.

The invention will now be described in connection with the accompanying drawing, FIG. 1 of which is a block diagram illustrating the invention in preferred form;

Figure 1:
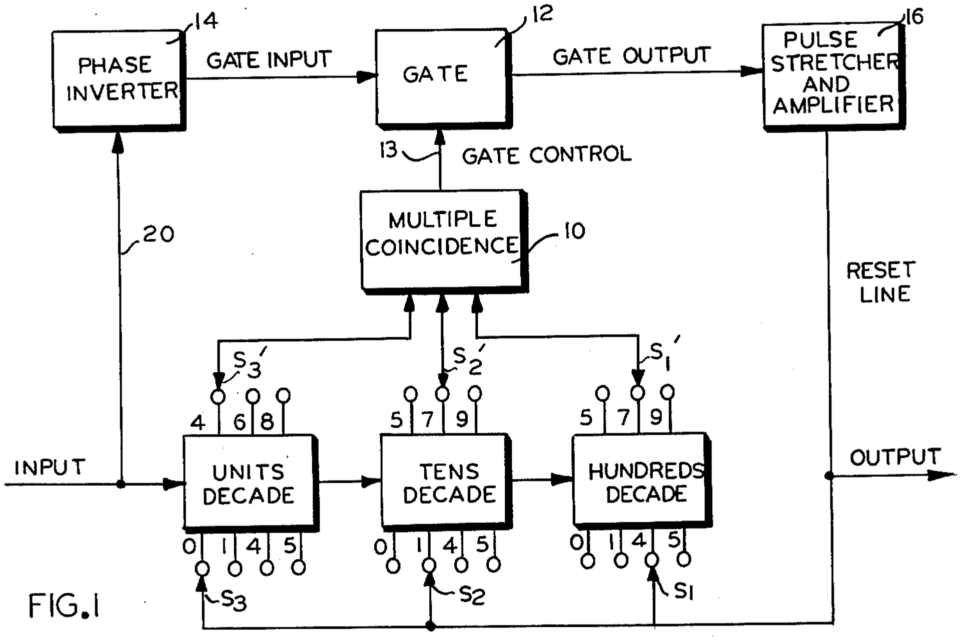

The system of FIG. 1 illustrates a three-decade divider comprising decades of units, tens and hundreds, but capable of containing more or less decades, as desired. In order not to detract from the novel features of the present invention and not to complicate the drawings and description herein, the technical details of the "flip-flop" or multivibrator electron-tube or transistor or other switching-relay circuits of the decade counters are not illustrated. The decade circuits, indeed, are described in my said article and are well-known in the art.

Suffice it for present purposes to state that the "Units Decade," the "Tens Decade" and the "Hundreds Decade" each has provisions for selection of one of four so-called reset states, numbered 0, 1, 4 and 5. There are three so-called recognition states, numbered 4, 6, 8, in the "Units Decade," and 5, 7, 9 in the "Tens Decade" and "Hundreds Decade." As before stated, the mechanisms for producing the recognition and reset operations are fully set forth in my article and form no part of the novelty of the present invention, so that they need not be further explained, though a preferred reset-pulse-generating circuit is later described.

For illustration purposes, the "Hundreds Decade" reset switch $S_1$ is shown set at the 4 state; the switch $S_2$ of the "Tens Decade," at the 1 state; and the switch $S_3$ of the "Units Decade" at the 0 state. The counter thus resets to state 410 when energized by a pulse on the "Reset Line." Recognition switches $S_1^1$, $S_2^1$, $S_3^1$ of the respective "Hundreds Decade," "Tens Decade" and "Units Decade" are respectively set to states 7, 7, and 4. As later explained, coincident outputs occur on the three recognition lines from respective switches $S_1^1$, $S_2^1$, $S_3^1$ to the multiple coincidence gate 10 whenever the counter is in state 774. In this illustration, it is intended that the divider system scale by a factor N of 365. With a counter reset state of 410, as before mentioned, the method set forth in my said article would require a recognition state of 775 since the difference between the two states, 775—410=365, constitutes the divider scale factor, N.

In accordance with the present invention, however, the recognition switches $S_1^1$, $S_2^1$, $S_3^1$ are set to a state preceding the actual state that is to be recongized and that is to initiate the resetting. Thus, if recognition of the state following the N pulse is required, the present invention contemplates recognizing the state following the (N–1) pulse. The three recognition outputs at switches $S_1^1$, $S_2^1$ and $S_3^1$ are fed, as previously indicated, to a triple coincidence circuit 10 of any conventional type, such as a three diode "and" gate (see, for example, Pulse and Digital Circuits, by Millman and Taub, McGraw-Hill, 1956, pages 397–400), that, in turn, connects by conductor 13 to a gate circuit 12, a preferred form of which is later described in connection with FIG. 3. The gate 12 begins to open on reaching state 774, and the next pulse, which advances the counter to state 775, after phase inversion in a phase inverter 14, hereinafter discussed, passes through the gate 12 and generates an output pulse. The output pulse is amplified and stretched in the pulse stretcher and amplifier 16 to serve as a reset pulse for application to the decade units to reset them to state 410, as schematically illustrated by the "Reset line" feeding back to the decade counter circuits. The amplified and stretched output pulse also serves as the output of the complete frequency divider.

Figures 2A, 2B, 2C, 2D, 2E:
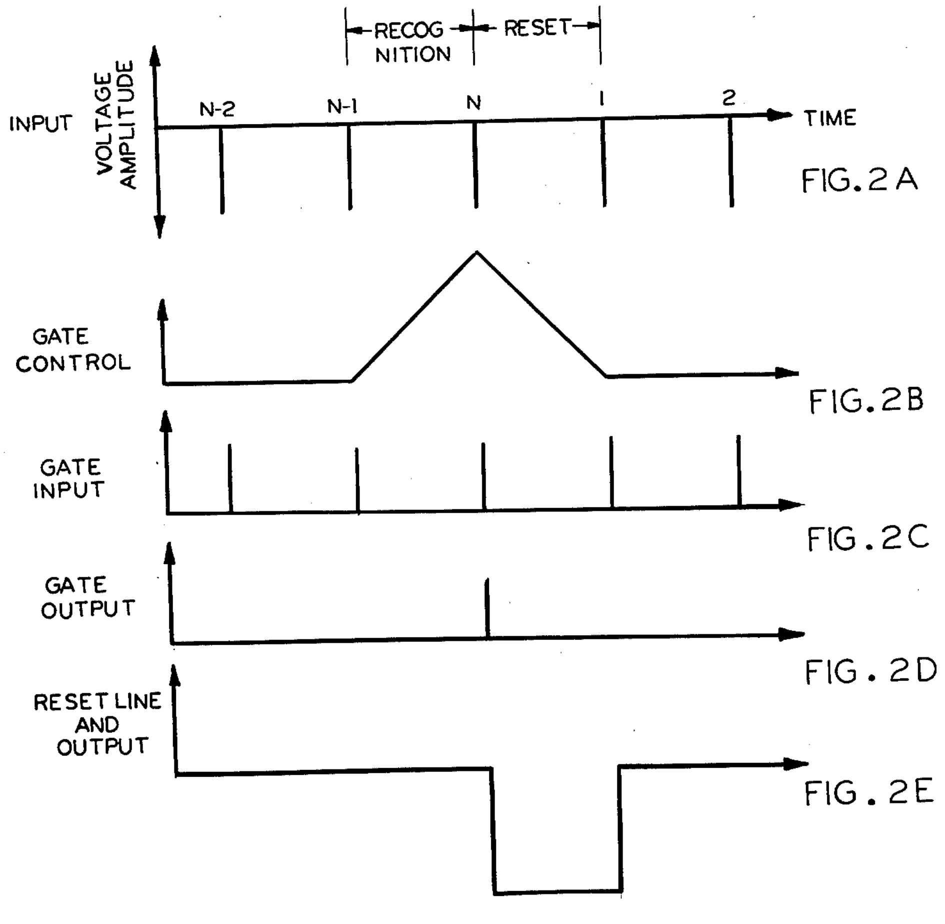
FIGS. 2A through 2E are graphs, plotting voltage amplitude along the ordinate and time along the abscissa, and illustrating the voltages at various locations in the circuit of FIG. 3.

In accordance with the present invention, therefore, recognition commences with the state (774) following the (N–1) pulse (364), and the reset pulse commences with the N pulse (365). The recognition and reset operations, thus, no longer share the same single interval after the N pulse which required the one-half microsecond resolution of the "Units Decade" in the system described in my said article. Each operation now is provided with a full pulse interval of one microsceond, thus relaxing the resolution required of the "Units Decade" by a factor of two. Referring to FIG. 2A, therefore, the period between the (N–1) and N input pulses is labelled "Recognition," and the period between the N pulse and the next input pulse 1, the "Reset" period.

Figure 3:
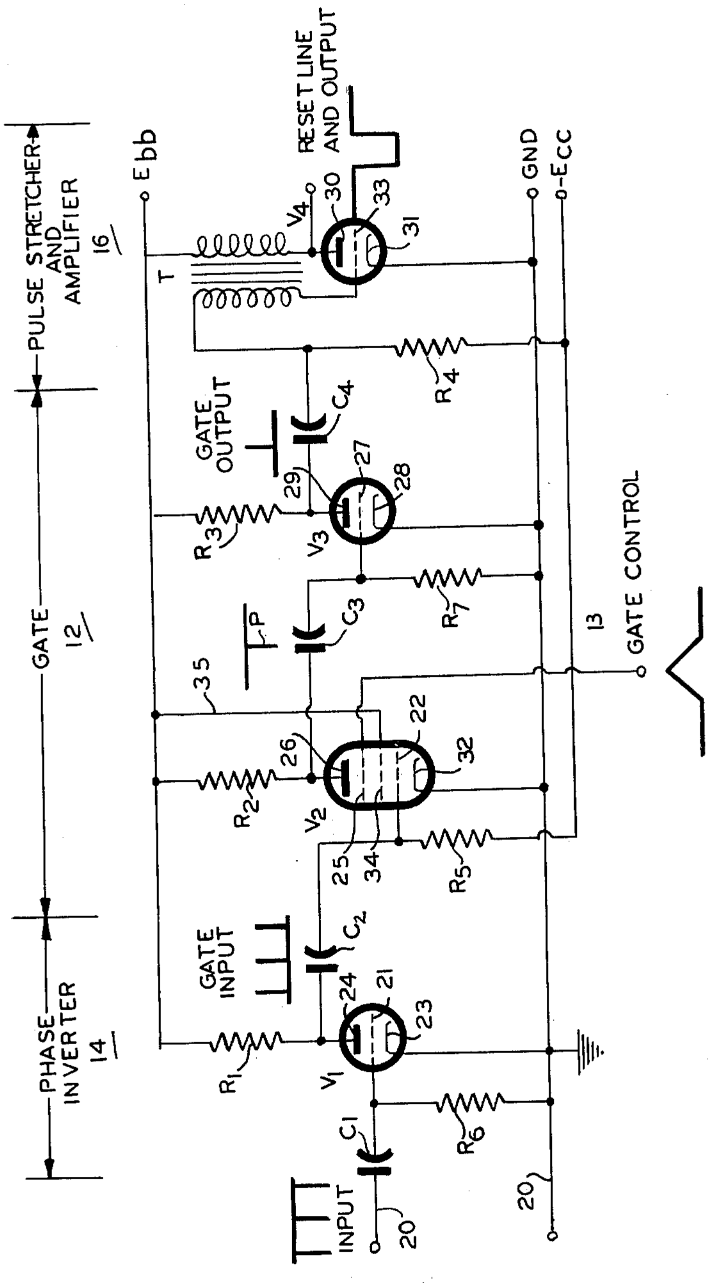
FIG. 3 is a schematic circuit diagram of preferred details of the reset-pulse generating system of FIG. 1.

A preferred circuit for effecting this result is shown in FIG. 3, the negative input pulses of FIG. 2A being applied both to the "Units Decade" of FIG. 1 and by conductors 20 and through coupling condenser $C_1$ between the control electrode 21 and the cathode 23 of an electron-tube phase inverter $V_1$. The output at the plate 24 of the tube $V_1$, will thus comprise positive pulses, labelled "Gate Input" and shown in timed relation in FIG. 2C. These positive pulses are fed through coupling condenser $C_2$ to the first control electrode 22 of a multigrid gate tube $V_2$ comprising the gate 12, that control electrode normally being negatively biased by the potential $-E_{cc}$ through a resistor $R_5$. Applied to the second control electrode 25 of the gate tube $V_2$, by way of conductor 13 is the output of the multiple coincidence circuit 10, labelled "Gate Control" and more clearly shown in FIG. 2B. The gate control response of FIG. 2B is ultimately converted in the gate circuit 12 into a gate output pulse, FIG. 2D. This occurs as follows. The resulting negative output pulse P produced at the time of the N pulse at the plate 26 of the gate tube $V_2$ is applied through coupling condenser $C_3$ between the control electrode 27 and cathode 28 of a further phase inverter tube $V_3$ associated with the gate 12. There thus results at the plate 29 of tube $V_3$, the positive pulse labelled "Gate Output," also shown in FIG. 2D. This "Gate Output" pulse is fed through condenser $C_4$ to the pulse stretcher and amplifier 16 comprising a blocking oscillator tube $V_4$ and associated transformer T, the operation of which is well-known, to produce, between the plate 30 and cathode 31, a wider, amplified output pulse labelled "Reset Line and Output" and more particularly shown in FIG. 2E. Further detailed description of the circuit appears to be unnecessary; the cathodes of the respectively tubes $V_1$, $V_2$, $V_3$ and $V_4$ being shown connected to the negative and preferably grounded terminal GND of the plate supply source; the plates or anodes 24, 26, 29 and 30 being all connected to the positive plate supply terminal $E_{bb}$ through respective load resistors $R_1$, $R_2$, $R_3$ and the secondary or right-hand winding of the blocking oscillator transformer T, respectively; the control electrode 33 of the stage $V_4$ being normally negatively biased to cut-off from the terminal $-E_{cc}$ through resistor $R_4$; input grid-to-cathode resistors $R_6$ and $R_7$ being provided for the stages $V_1$ and $V_3$; and the screen-grid electrode 34 of the gate tube $V_2$ being normally positively biased by its connection at 35 to the positive plate supply terminal $E_{bb}$.

Figure 4:
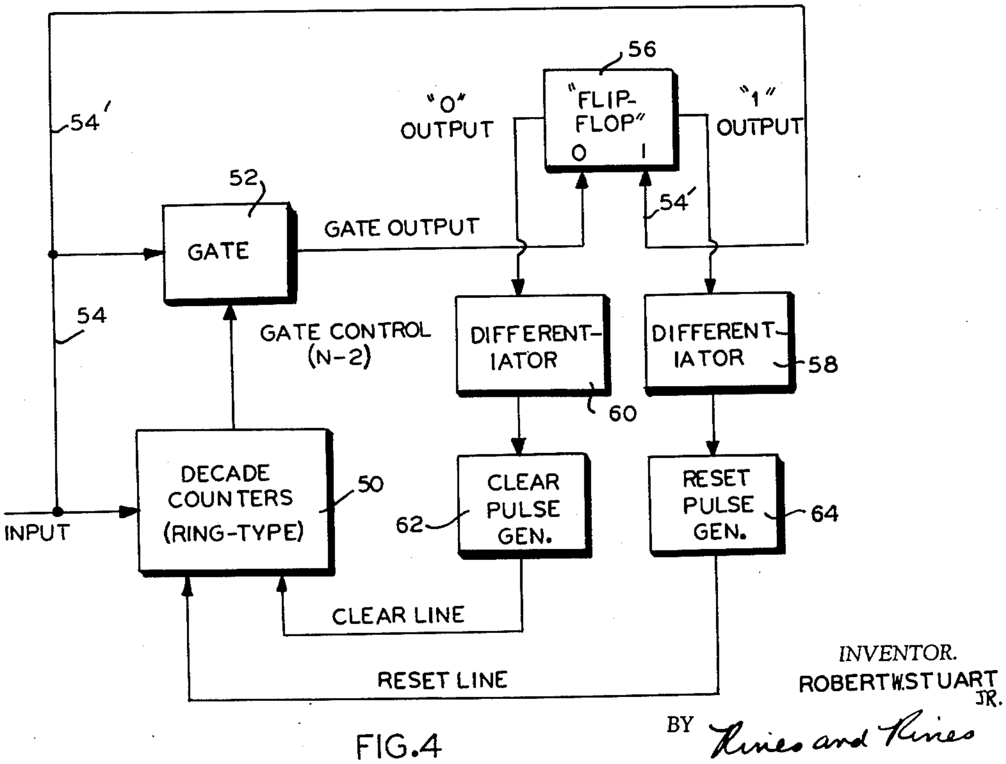
FIG. 4 is a view similar to FIG. 1 of a modification.

The invention is not, however, limited to the recognition of the counter state following the (N–1) pulse. Thus, as another illustration, the recognition of the state following the (N–2) pulse may be employed in the embodiment of FIG. 4. The use of the recognition of the state following the (N–2) pulse, moreover, will enable the employment of still a further operation besides recognition and resetting. In order to show the versatility of the invention, a conventional ring-type decade counting system is shown at 50 in FIG. 4 (see, for example, pages 339–344 of the said Pulse and Digital Circuits text), that requires a clearing operation as well as recognition and resetting. The counters 50 feed a gate 52, which may be similar to the gate 12 of FIG. 3, and which is also connected by conductor 54 to the input pulses. A bistable multivibrator or "flip-flop" 56 is provided, the input to the right-hand stage of which is connected by conductor 54' to receive each input pulse, and is designated the "1" set input. The other or "0" input, of the "flip-flop" 56 is shown fed from the output of the gate 52 by the conductor labelled "Gate Output."

Figures 5A, 5B, 5C, 5D, 5E, 5F, 5G, 5H, 5I:
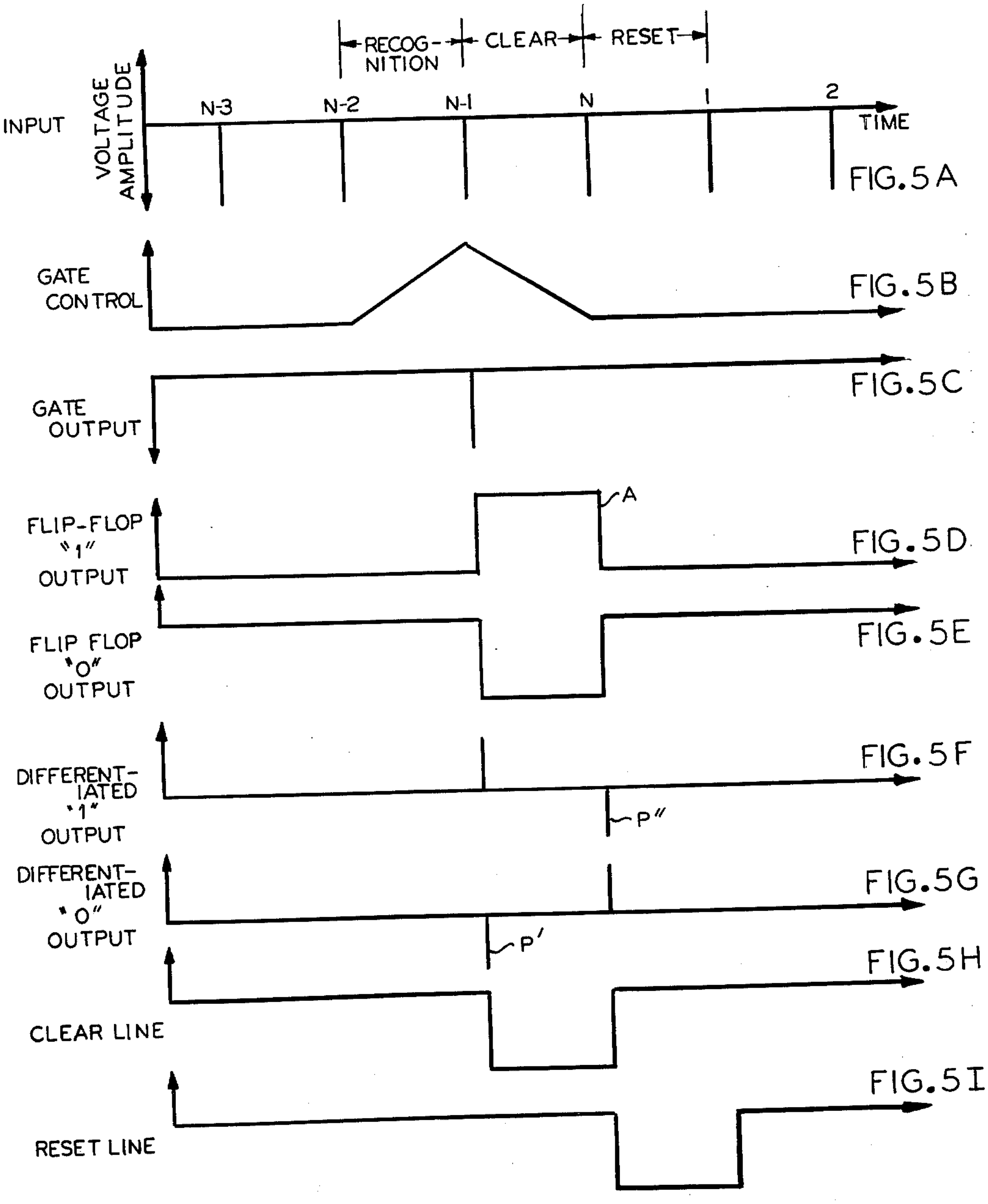
FIGS. 5A through 5I are graphs, similar to FIGS. 2A through 2E of voltage wave-forms in the system of FIG. 4.

In operation, the state following the (N–2) input pulse, FIG. 5A, is recognized in the counters 50 and is used to open the gate 52 to produce the gate control impulse of FIG. 5B, corresponding to that of FIG. 2B in connection with the embodiment of FIG. 1, but occurring between the (N–2) and (N–1) pulses. The resulting gate output, FIG. 5C, corresponds to the (N–1) pulse, and its application to the before-mentioned "0" input of the "flip-flop" 56 occurs at the same time the (N–1) pulse is fed along conductors 54 and 54' to the "1" input of the "flip-flop" 56. Since the "flip-flop" 56 is at this time in the "1" state, because it has received each successive input pulse along conductor 54', the "flip-flop" complements, or switches to the opposite state (see, for example, pages 146–164 of the said Pulse and Digital Circuits text). The "1"-to-"0" transition of the "flip-flop" 56 results in a positive pulse, FIG. 5D, at the "1" output and a negative pulse, FIG. 5E, at the "0" output. These pulses are differentiated by respective differentiating circuits 58 and 60. The output of differentiator 60 results in a negative pulse $P^1$, FIG. 5G. The negative pulse $P^1$ triggers a blocking or other oscillator 62, labelled "Clear Pulse Gen," thereby to produce a negative pulse during, though not necessarily as long as, the period (N–1)-to-N, FIG. 5H, for clearing the ring count. The term "during" as used herein, is not, therefore, restricted to the condition of the negative pulse being actually as long as the said period, as shown. The N pulse thereupon energizes the input "1" of the "flip-flop" 56 (now in the "0" state), thus resetting it to the original "1" state. In so doing, there is produced the fall or drop A in the pulse output at the "1" output terminal, FIG. 5D. This gives rise to the negative pulse $P^{11}$ in the output of differentiator 58 which triggers the "Reset Pulse Gen" 64, to produce the counter reset pulse of FIG. 5I during, though not necessarily as long as, the period between the N pulse and the next reset pulse 1. In a one-megacycle ring counter, therefore, a full microsecond is available for each of the recognition, clearing and resetting operations.

In the system of FIG. 1, above described, the special countercoding techniques described in my said article are still desired; i.e., the 4 re-set and 3 recognition state code of FIG. 1 (or an equivalent 6 re-set and 2 recognition state code involving re-set states 0, 1, 2, 3, 4 and 5 and recognition states 5 and 9). The 2 reset, 5 recognition state code, also described in my said article, is preferred for the ring counters of FIG. 4. The present invention, as before stated, relaxes the resolution requirements of such systems by a factor of two-to-one for the "Unit Decade" of FIG. 1 and by a factor of three-to-one for the ring counter of FIG. 4.

It will be evident that a wide variety of different types of well-known apparatus may be used, such as those described in the said Pulse and Digital Circuits text, to practice the logic technique or method of operation underlying the invention; such apparatus presently being combined and operated in accordance with different methods to obtain different functions and results, as described, for example, in my said article.

Further modifications will occur to those skilled in the art and all such are considered to fall within the spirit and scope of the invention as defined in the appended claims.

What is claimed is:

1. An electric system having, in combination, multiple decade counting circuits, means for applying input pulses to the counting circuits, means for selecting a number N of pulses to be counted by the decade counting circuits, a multiple coincidence circuit responsive to the recognition of the state of the counting circuits following a pulse preceding the N pulse to produce a control signal extending over the period from said preceding pulse to the N pulse, a gate circuit connected to the multiple coincidence circuit and to the input-pulse applying means to produce an output pulse corresponding to the N pulse in response to the application of said control signal and the N pulse to said gate circuit concurrently, pulse-stretching and amplifying means responsive to the output pulse for producing a reset pulse during the pulse period following the advent of the N pulse, and means for applying the reset pulse to the decade counting circuits.

2. An electric system as claimed in claim 1 and in which the decade counting circuits comprise units, tens and hundreds decades, and the said connection between the gate circuit and the input-pulse applying means includes a phase inverter.

3. An electric system having, in combination, ring-type decade counting means, means for applying input pulses to the counting means, means for selecting a number N of pulses to be counted by the counting means, a gate circuit responsive to the recognition of the state of the counting means following the (N–2) pulse and connected to the counting means and to the input-pulse applying means to produce a gate output pulse corresponding to the (N–1) pulse, a flip-flop circuit having a pair of inputs and a pair of outputs, means for connecting the input-pulse applying means to one of the flip-flop inputs and for applying the gate output pulse to the other flip-flop input, differentiating means disposed in each of the flip-flop outputs, a clearing-pulse generator connected to one of the differentiating means to produce a clearing pulse, a reset pulse generator connected to the other differentiating means to produce a reset pulse, and means for applying the clearing and reset pulses to the counting means.

References Cited in the file of this patent

UNITED STATES PATENTS

| | | |
|---|---|---|
| 2,558,447 | MacSorley | June 26, 1951 |
| 2,604,263 | MacSorley | July 22, 1952 |
| 2,767,313 | Martinelli | Oct. 16, 1956 |
| 2,824,961 | Paininen | Feb. 25, 1958 |
| 2,840,708 | Sandiford | June 24, 1958 |
| 2,937,337 | Jones et al. | May 17, 1960 |